United States Patent [19]

Power et al.

[11] 4,076,666

[45] Feb. 28, 1978

[54] RELEASE COMPOSITION

[75] Inventors: George Edward Power; Donald Louis Bolling, both of Cincinnati, Ohio

[73] Assignee: Formica Corporation, Cincinnati, Ohio

[21] Appl. No.: 738,214

[22] Filed: Nov. 3, 1976

[51] Int. Cl.$^2$ .................... C09D 3/52; C09D 3/66
[52] U.S. Cl. .................... 260/22 CB; 260/21; 260/23 P; 428/319
[58] Field of Search ............... 260/22 CB, 23 P, 21

[56] References Cited

U.S. PATENT DOCUMENTS

| 3,282,727 | 11/1966 | Crone et al. | 260/21 |
| 3,497,466 | 2/1970 | Markulin et al. | 260/21 |
| 3,770,687 | 11/1973 | Mestetsky | 260/30.8 R |
| 3,946,135 | 3/1976 | Peterson | 428/526 |

*Primary Examiner*—Ronald W. Griffin
*Attorney, Agent, or Firm*—Frank M. Van Riet

[57] ABSTRACT

A composition useful in the production of heat and pressure consolidated laminates as a coating on a paper release sheet comprising a mixture of
  A) an oil-modified alkyd resin,
  B) a polyalkylether of a polymethylol melamine and
  C) a copolymer of an unsaturated acid, ester or anhydride and a vinyl ether or an unsaturated alkyl compound.

10 Claims, No Drawings

RELEASE COMPOSITION

CROSS-REFERENCE TO RELATED APPLICATIONS

This application is related to copending application, Ser. No. 738,213, filed of even date herewith and entitled RELEASE SHEET.

BACKGROUND OF THE INVENTION

Presently known art in the manufacture of textured high pressure decorative laminates is as follows:

An assembly consisting of the following is placed in a flat-bed hydraulic press, whereupon heat and pressure are applied:
—Iron
—Paper cushion
—Stainless steel plate
—Laminated aluminum-paper caul stock
—Overlay sheet
—Decor sheet
—Layers of phenolic-kraft core stock
—Separator sheet (center line)

The assembly is symmetrical about the center line, therefore, only the upper half is shown. For a complete description of high pressure laminating, see Encyclopedia of Polymer Science and Technology, John Wiley and Sons, Vol. 8, pps. 121–163 (1968).

The aluminum-paper caul stock now used, consists of alloy No. 1100 usually in fully annealed state (—0 temper), but also frequently in a harder state such as H-18 or H-19 (full hard). The aluminum foil portion may have a matte finish, a polished finish or a mill finish on its exposed face. The aluminum is bonded to a paper of about 40 lbs./ream by means of casein adhesives. This operation is performed by the caul stock supplier. (see I.O. Robertson, Jr. "Use of Aluminum Foil Release Sheet in Decorative Laminates," TAPPI, Vol. 55, pps. 1341–4, September, 1972.)

When fully annealed alloy No. 1100 in a thickness of 0.0005 inches is laminated matte side out to a 40 lb./ream machine glazed natural kraft paper, it is often called "No. 6 Caul Stock." When used in the above assembly, it will produce a high pressure laminate with an arithmetic average (AA) roughness of about 90 ± 20 microinches. See "Surface Texture" (ASA B46.1-1962) American Society of Mechanical Engineers, New York, 17, N.Y. Its gloss will be 5°–10° measured on a Gardner 60° glossmeter and will depend upon the particular specimen of caul stock chosen. Most rolls will produce laminates of about 6°–8° gloss, but others will produce values up to 10° or higher.

Because of this variation in gloss, it is customary to finish these laminates by the process of "dull rubbing." In this process the laminate is passed through a machine in which its decorative surface is contacted by a number of rotating, cylindrical, nylon fiber brushes. The brushes are flooded with a slurry of pumice and water which abrades the laminate surface and reduces its gloss by about 1°–5° depending upon the force which is used to bring the brush into contact with its surface. Typically, a laminate emerging from the press with a gloss of 6.5 would be dull rubbed with light contact pressure and abraded to a gloss of about 5.5. A laminate having a gloss of 10, however, would require a substantially higher force to bring the brush into very firm contact with the laminate. Even then the reduction in gloss might be only about 3°, say to about 7°.

If the aluminum foil caul stock were more uniform, it would produce laminates having glosses within the range of 6 ± 2, which is commercially desirable. The dull rubbing could then be eliminated which would reduce the cost of manufacture. Additionally, the micro-scratches imparted to the laminate surface during dull rubbing render it less resistant to staining (see Standards Publication LD1-1971, Laminated Thermosetting Decorative Sheets, National Electrical Manufacturers Association, New York, N.Y. 10017 (1971) for method of test). This is due to the fact that thousands of micro-cracks are introduced into the surface into which very small particles of staining or soiling materials may enter and lodge tenaciously.

Laminates made with the use of No. 6 Caul Stock have a distinctive texture which is often referred to as a "suede" finish, more by custom than any resemblance to a true suede leather.

The suede texture has proven to be of special importance because it is attractive to the touch, yet serves to overcome "telegraphing" of joints, glue lines, coarse grain and other discontinuities which may occur in modern furniture structures, especially those which use frame construction as opposed to solid panels, e.g., in a table top. "Telegraphing" is used in the industry to designate the ability of a plastic sheet to reproduce in its upper surface whatever texture may be possessed by the substrate upon which it rests. Thus, for many years, the best practice in mounting high pressure laminates was to use hardwood faced plywood, usually birch or maple. With the advent of reconstructed wood particle-board for laminate substrates, it became the practice to use three layer construction which featured a layer of "fines" on the bondable surfaces to eliminate "telegraphing."

Furniture manufacturers learned that the suede surface is only mildly textured and that the ultimate furniture user will not be unduly aware of the depth of the texture. For instance, such a textured laminate will provide a suitable writing surface if used as a desk top.

Because of this unique dimension in texture, i.e., one which is coarse enough to hide telegraphing, yet smooth enough to be accepted as planar, this "mini texture" has enjoyed great popularity and now accounts for over 50% of all the commercial laminates produced in the U.S.

The amount of aluminum foil used in laminate production is very substantial so that the aggregate value of such foil consumed annually is very great. Laminate manufacturers have, therefore, sought materials which would be lower in cost on a unit basis, since the annual savings to be realized are of an important magnitude. One manner in which this may be accomplished is to replace the aluminum caul stock with a sheet of paper which is coated with a material which will fill surface voids and impart a texture of sufficient smoothness and gloss to the surface of a decorative laminate. Textured laminates may have useful gloss levels ranging from about 6 units to about 25–30 units.

It is necessary for the texturing sheet to release readily after it has been used on the laminate, hence a release agent of some type is often applied in a very thin layer over the basic texturing coat. In U.S. Pat. No. 3,946,135 to Peterson, such a release paper is described. Said release paper comprises a first coat constituting a clay-adhesive base coat and a second coat of a thermosetting resin.

The need for two coats makes the cost of the coated paper greater since one must either (i) mount the paper on the coater twice (ii) have access to a two station coater (which is more costly) or (iii) buy the paper with one coat already applied (which again is more costly).

It can be readily appreciated that a single coating which accomplishes both the filling and texturing of the paper as one function and permits ready release from a decorative melamine laminate as a second function is simpler and cheaper than the two coat variety.

Single coat release sheets can be prepared by the use of an additive in the texturing coat which makes it releasable upon drying. Such a material is called an "internal release agent" because it is contained internally in the texturing coat as it is applied. Release agents which are applied as a distinctly second coat are called "external release agents" since they never enter the central volume of the texturing coat. (See "Selecting Mold Release Agents for FRP" J. W. Waldeck, *Plastics World*, pps. 40–42, Jan. 19, 1976.)

As noted by Waldeck, the precise mechanism by which internal release agents operate is not known. Without being restricted to any particular mechanism herein, it appears that relationships between the solubility of the internal release agent in the carrier vehicle (in this case the texturing coat) as applied and as it dries, along with the ability of the release agent to repel the components of the object to be released (in this case a melamine resin surfaced decorative laminate) are the determining factors in the effectiveness of the coating. It is known that the release agent is initially soluble in the texturing coat resin and its solvent system. As the texturing coat loses solvent during drying, and/or as the texturing resin changes character during thermosetting, it is believed the release agent becomes less soluble and thereupon migrates to and concentrates at the surface of the texturing coat. Later when the texture-release paper is laid adjacent to the laminate surface, the concentration of release agent at the coated surface prevents adherence of the two contacting surfaces.

SUMMARY

Novel release compositions which can be used to produce release sheets used in the production of laminates via heat and pressure consolidation of resin impregnated paper sheets are disclosed herein. The novel compositions provide the release sheet with the type of surface required of commercial users at a much lower cost than aluminum foil release sheets. The unique resinous compositions are composed of a mixture of two resinous materials which function synergistically when combined and coated on paper.

DESCRIPTION OF THE INVENTION INCLUDING PREFERRED EMBODIMENTS

The novel release compositions of the present invention comprise an organic solvent solution of a mixture comprising
(1) from about 75% to about 99%, by weight, based on the total weight of (1) and (3), of an oil-modified alkyd resin,
(2) from about 30% to about 70%, by weight, based on the total weight of (1) of a polyalkylether of a polymethylol melamine and
(3) from about 1% to about 25%, by weight, based on the total weight of (1) and (3), of a copolymer containing from about 15 to about 85 mole percent of recurring units having the formula

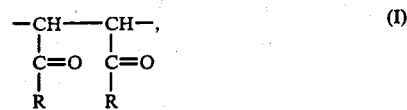

wherein each R is, individually, $OR^1$, $R^1$ being hydrogen or $C_1$–$C_{22}$ alkyl, or the two R groups taken together form an oxa group and the remaining units are recurring units of the formula

wherein $R^2$ is hydrogen or methyl, $R^3$ is a $C_9$–$C_{30}$ hydrocarbon radical and X is O or $CH_2$.

The substrates utilized to form release sheets from the novel compositions hereof comprise any cellulosic sheet such as bleached sulfate, kraft, clay coated kraft, parchment, clay coated parchment, greaseproof paper, glassine paper clay coated publication paper and the like. Grease-proof paper is well known to those skilled in the art as is glassine paper, a complete description of each being set forth in the Second Edition, Volume III, of Papermaking and Paperboard Making, McGraw-Hill Book Company, 1969, page 182, Pulp and Paper Manufacture, Ronald G. MacDonald, Editor. Two useful materials are SC Dark Amber glassine and Lard-Pak, manufactured by St. Regis Paper Company, Rhinelander, Wis., see also U.S. Pat. No. 3,770,687.

The oil-modified alkyd resins herein are well known in the art and are generally disclosed in U.S. Pat. Nos. 2,579,980; 2,600,623; 2,618,617; 2,648,642; 2,649,423 which patents are hereby incorporated herein by reference.

In the preparation of these oil-modified alkyd resins useful herein, the amount of oil present as a modifier should range from about 5% to about 50%, by weight, based on the total weight of the modified alkyd resin. The alkyd resins may be prepared from saturated or unsaturated polycarboxylic acids, however, the saturated acids are preferred. Suitable acids include phthalic, isophthalic, terephthalic, succinic, oxalic, malonic, succinic, glutaric, sebacic, adipic, pimelic, suberic, azelaic, citric, tricarballylic, tartaric, malic, maleic, fumaric, itaconic and the like.

Suitable polyhydric alcohols include ethylene glycol, propylene glycol, diethylene glycol, dipropylene glycol, trimethylene glycol, pinacol, trimethylol propane, neopentyl glycol, arabinol, sorbitol, glycerol, pentaerythritol and the like.

Suitable reaction conditions already known in the art may be employed, a slight excess of the alcohol being used to insure complete reaction. Among the oils which may be used to modify the alkyd resin are tung oil, tall oil, perilla oil, linseed oil, hemp seed oil, castor oil, cotton-seed oil, corn oil, olive oil, peanut oil, cod liver oil, candlenut oil and the like.

The oil-modified alkyd resin of the compositions used to form the release compositions of the instant invention are cross-linked with a suitable polyalkylether of a polymethylol melamine. Examples of these melamine materials encompass the dimethyl, diethyl, dipropyl, dibutyl etc. ethers; the trimethyl, triethyl, tripropyl, tributyl ethers; the tetramethyl, tetraethyl, tetrapropyl, tetrabutyl, etc., ethers; the pentamethyl, pentaethyl, pentapropyl, pentabutyl, etc., ethers; and the hexamethyl, hexaethyl, hexapropyl, hexabutyl etc. ethers of the dimethylol, trimethylol, tetramethylol, pentamethylol or hexamethylol melamines, of course, mixed polyalkyl ethers such as the dimethyl, tetraethyl ethers, etc., of the polymethylol melamines may also be used. The preferred melamine material is hexakismethoxymethyl melamine. These materials may be produced as set forth in U.S. Pat. Nos. 2,906,724; 2,918,452; 2,998,410; 2,998,411; 3,107,222; 3,422,076 which patents are hereby incorporated herein by reference. A suitable mole ratio of melamine to aldehyde, preferably paraldehyde is 1:3 to 1:6, respectively, and the alcohol used to impart the alkyl ether portion to the melamine material is preferably a $C_1$–$C_4$ alcohol. The amount of melamine material used to cross-link the oil-modified alkyd resin should range from about 30 to about 70% of the melamine material, based on the total weight of the oil-modified alkyd and the melamine material.

The vinyl ether or unsaturated alkyl copolymer which constitutes the other component of the novel release compositions is also known to those skilled in the art and is generally set forth in U.S. Pat. No. 3,770,687, hereby incorporated herein by reference, and its formation may be had via the method set forth therein and according to U.S. Pat. No. 2,047,398.

The vinyl ether or unsaturated alkyl copolymer can be prepared by copolymerizing about 15 to 85 mol percent of the vinyl ether or unsaturated alkyl monomer with correspondingly, about 85 to 15 mole percent of the maleic acid, ester or anhydride under conditions to produce copolymers having a relative viscosity of at least about 0.1. The preferred comonomers are maleic anhydride and a $C_{18}$ alkyl vinyl ether or octadecene-1.

The compositions of the instant invention are generally prepared as solutions of from about 0.5 to about 80.0%, by weight, based on the total weight of the composition, thereof in an organic solvent. The solvents useful include aromatic hydrocarbons such as benzene, toluene, xylene, etc.; aliphatic hydrocarbons such as hexane, heptane etc; dimethylformamide; butyrolactone; tetrahydrofuran; isopropanol; dimethylsulfoxide; dioxane; mixtures thereof and the like.

The compositions may be prepared by individually dissolving the oil-modified alkyd, the polyalkylether of the polymethylol melamine and the copolymer individually in their own solvents and then blending the resultant solutions to produce the composition or the components may be added to a single solvent in the proper concentrations to produce the compositions.

The release coating may then be applied to the paper substrate by any convenient means such as by reverse roll, air knife, gravure cylinder, etc., to a thickness of about 0.1 to about 0.3 mil (1.5–5.0 lbs/3000 ft.$^2$ ream, dry).

It is preferred that an acid catalyst be added to the release coating composition before application of it to the substrate in order to assure that the melamine compound fully cross-links the oil-modified alkyd. From about 1.0 to about 10.0%, by weight, based on the total weight of the oil-modified alkyd and the melamine material, should be used with p-toluene sulfonic acid being preferred. Xylene sulfonic acid, O- and m-toluene sulfonic acids, ethyl acid phosphate, n-butyl phosphoric acid, phosphoric acid, hydrochloric acid and the like can also be used.

If desired, conventional thickening agents, leveling agents, etc. may be added to the coating composition hereof in order to adjust its viscosity to the requirements of the coating equipment and to regulate pick-up, etc.

The coated paper substrate is then subjected to curing which involves subjecting the release sheet to heat to cross-link the alkyd with the melamine compound. A temperature ranging from about 200° to about 450° F can be used, cross-linking generally being complete in from 5 minutes to 15 seconds, correspondingly.

The release sheets produced from the compositions of this invention, as mentioned above, are exceptionally useful in the production of decorative laminates in that as release sheets they are capable of withstanding the heat and pressure required to produce decorative laminates without deterioration and release completely and rapidly from the resin-impregnated surfaces of the laminates after they are removed from the laminating press. They may be used in the production of the so-called "high pressure" laminates wherein a series of 3–12 phenol/formaldehyde resin impregnated kraft sheets are utilized as a core medium upon which are superimposed a melamine resin impregnated decorative surface of some specific design, i.e., simulated wood grain, and an overlay sheet which is also melamine resin impregnated, or so-called "low-pressure" laminates or panels which comprise a self-supporting substrate such as particleboard, plywood etc. upon which is heat and pressure consolidated a melamine resin impregnated decorative sheet, as described above. The amount of heat applied in the production of each type of product is about the same, i.e., from about 100°–250° F, however, the high-pressure laminates are produced at a pressure of over 900 psi and usually 1100–1500 psi while the low-pressure panels are produced below 900 psi, usually 250–750 psi.

The following examples are set forth for purposes of illustration only and are not to be construed as limitations on the present invention except as set forth in the appended claims. All parts and percentages are by weight unless otherwise specified.

EXAMPLE 1 (COMPARATIVE)

To 92.5 parts of a commercially available alkyd resin solution produced from 39.7 parts of soya oil, 41.3 parts of isophthalic acid and 19.0 parts of glycerol and having a solids content of about 62%, a viscosity of 23–29 secs. #2 Zahn cup. 77.0° F and a density of 8.4–8.7 lbs./gallon, in a 67/33 isopropanol/xylene solvent, and containing 50% of hexakismethoxymethyl melamine, are added 7.5 parts of a catalyst solution comprising 50% p-toluene sulfonic acid and 50% isopropanol. By means of a gravure printing cylinder having a quad cell pattern of diagonal count of 120 per inch and a cell depth of 0.0032 inch uniformly knurled over its entire face, the alkyd-catalyst mixture is applied to a 35 lb./3000 ft.$^2$ ream bleached kraft grease-proof paper at a 0.2 mil thickness. The coated paper is then cross-linked in a high velocity hot air oven for 30 secs. at 280° F. The coating weight, after cross-linking, is 3.5 lbs./3000 ft.$^2$ ream.

In order to determine that the coating is cross-linked, two pieces of the coated paper are arranged so that the coated sides face each other. The assembly is placed in a quick acting press with a platen temperature of 450° F and maintained under 40 psi for 6 seconds. The paper sheets are removed, cooled to room temperature and then peeled apart by hand. The two sheets separate readily with no signs of sticking, picking of paper fibers or other evidence of undercure.

The coated paper is then cut into 4 + 8 feet sheets and placed in a press pack assembly as follows top to bottom;
- A. A stainless steel press plate with its polished surface facing downward.
- B. A sheet of the coated paper with its coated surface downward.
- C. A conventional overlay sheet comprising a 28 lb./3000 ft.$^2$ ream, α-cellulose paper having impregnated therein about 64 weight percent of a commercial melamine/formaldehyde laminating resin. The volatile content is about 5%.
- D. A conventional pigmented decorative paper bearing a wood grain print, facing upward and having impregnated therein about 40 weight percent of a commercial laminating resin similar to that in the overlay. The volatile content is about 5%.
- E. Five plies of a 115 lb./3000 ft.$^2$ ream kraft saturating paper having impregnated therein 25 weight percent of a conventional phenol/formaldehyde laminating resin. The volatile content is again about 5%.
- F. A layer of glassine paper as a separator sheet.

The entire assembly is then repeated in inverted order to produce a so-called "back-to-back" press assembly, whereupon it is fitted with conventional layers of cushion paper on the outside surface of the stainless steel press plates. The entire assembly is then sandwiched between appropriate cold rolled steel plates and placed into a conventional high pressure laminating press. A pressure of 1400 psi is applied to the assembly. It is heated to 142° C in about 25 minutes and held at that temperature for 12 minutes. The entire assembly is then cooled to room temperature and withdrawn from the press and the laminates are recovered.

It is found that the coated paper which was to act as a release sheet is bonded strongly to the decorative surface of the laminates and that only small pieces can be removed. Numerous white patches of paper fiber remain bonded even where pieces of the release sheet are removed.

EXAMPLE 2

Following the procedure of Example 1, the alkyd resin-melamine and catalyst solutions are combined to produce 100 parts by weight of mixture. To the mixture are added 5.0 parts of a 40% solution in toluene of an alkyl vinyl ether/maleic anhydride copolymer in which the alkyl vinyl ether mixture (96% $C_{18}$ alkyl, 2% $C_{16}$ alkyl and 2% $C_{10-14}$ alkyl vinyl ethers) is copolymerized with an equimolar amount of maleic anhydride.

The paper is then coated in the identical manner and used as a texturing-release sheet on a laminate as before.

It is found that the coated paper now releases readily from the laminate, leaving no particles of paper, resin or other debris. In order to measure the ease with which such paper can be stripped from the laminate, the following test is performed.

Using a sharp knife, a slit is made from the upper (uncoated) surface of the release sheet as it yet remains on the pressed laminate and before any effort has been made to disengage it from the laminate. The slit is cut along a straight line using a metal rule as guide for a distance of 10 inches. From one end of this slit, a second slit is cut for 10 inches in a direction perpendicular to the first slit. At the point of intersection of these slits, a small flap is raised by the insertion of the knife edge and the paper is peeled from the laminate along a line bisecting the angle between the two slits, that is, along a line at 45° to the original slits. When about 1.5 inches has been so lifted, a spring type paper clip is attached to the paper flap and the clip allowed to close so that it holds the paper firmly. A spring balance capable of reading up to 50 grams is attached to the paper clip and the stripping of the paper continued along the direction of the bisector. As the paper is stripped back, the line along which peeling occurs is approximately perpendicular to the bisector and increases in length as peeling is continued. At the point where the paper-laminate contact line is 5 inches in length, the force required to continue peeling is noted on the balance. This is about 25 grams. The test is repeated numerous times and forces from about 15 grams to about 40 grams along a 5 inch line of contact are noted. The numerical value of the force so measured is called the "cling strength."

The laminate produced above is found to have a roughness (AA) of about 90 microinches and a 60° gloss of 5.5.

EXAMPLES 3–11 (COMPARATIVE)

The following materials are added to the alkyd resin-melamine-catalyst solution of Example 1 in the amounts of 1 part, 5 parts and 10 parts by weight.
3. Paraffin wax
4. Stearic acid
5. Oleic acid
6. Sodium stearate
7. Methyl stearate
8. Petrolatum
9. Polyethylene
10. Lecithin
11. Pentaerithrytol tetrastearate Each material in each of the said amounts is used in the resin-catalyst solution as a coating for the texturing paper. Each coated paper is then used as a release sheet during the production of a laminate.

None of the resultant sheets exhibit any releasing properties. The cling strength is in excess of 500 grams in all cases. In most cases, particles of paper stick to the laminate. In some cases, the paper cannot be removed from the laminate at all.

CLING STRENGTHS

At a cling strength of 60 grams/5 in., it is found that the release paper can be stripped from the laminate without the picking of paper fiber or other residues. At much above this level, however, it is difficult to remove the entire sheet of release paper from the laminate surface. Commercial laminates are produced in volume in 5 × 12 feet sizes. It is desirable that the person who is removing the release sheet for discard be able to do it with ease, usually with a gentle, sweeping pull from one end of the sheet. If the paper does not release easily from every part of the laminate, it is necessary to pull several times or even to walk around the sheet to loosen the more clinging areas. This takes time which means that either the conveyor line carrying the laminates to be stripped must be slowed or additional manpower be used. Either solution increases the cost of operation. Thus a miximum useful cling strength is below about 60 grams/5 in., with preferred values being in the range of 15–40 grams/5 in.

EXAMPLES 12-13 (COMPARATIVE)

Commercial release agents known to be highly effective in causing release of melamine-formaldehyde materials from metal molds and of laminates from press plates are obtained. These are supplied in an aerosol can. The first (Example No. 12) is stated to be a non-silicone so that later painting or spraying of the part will not be hindered. The second (Example No. 13) also an aerosol, consists of telomers of fluorocarbons.

Each of these compounds is recovered from the aerosol package by allowing the propellant to escape. That of Example No. 12 is added to an alkyd-melamine-catalyst solution of Example 1 in the amounts of 1, 5 and 10 parts of the former to 100 parts of the latter.

In a similar manner, that of Example No. 13 is added at the level of 10 parts per hundred of alkyd-melamine-catalyst solution.

The alkyds containing the above additives are used to coat greaseproof papers and, in turn, the resultant coated papers are used as release sheets in high pressure laminate production. Upon removal from the press, it is found that papers could not be separated from the laminate surfaces. That is, they both had an "infinite" cling strength.

EXAMPLE 14

Release sheets are prepared as in Example 2 sufficiently large to cover 4 × 10 feet press plates. The release sheets are inserted between the polished press plates and the surfacing prepregs of a low pressure panel (particle-board substrate) with the coated face of the release sheet adjacent to the prepreg. Release sheets are used on the top and bottom plates.

When the press is opened and the board is ejected hot after lamination, the release sheet remains with the board and is cleanly released from the polished plates. While still hot, the release sheet is removed from the decorative board with a cling strength of about 20 gms/5 in. The surface of the board is found to have a roughness (AA) of about 100 microinches and a 60° gloss of 6.

EXAMPLES 15-17 (COMPARATIVE)

The alkyl vinyl ether/maleic anhydride copolymer of Example 2, is reduced to a solution containing 20% solids in toluene and the alkyd resin component is omitted. This solution is applied to (Example 15) a commercially available greaseproof paper by gravure coating in the amount of 3.5 lbs./ream dry. In a similar manner (Example No. 16) a 35 lb./ream glassine paper and (Example No. 17) a 55 lb./ream clay coated publication paper have 3.5 lb./ream dry coats of the copolymer applied. Each of these sheets is then used for release purposes, as in Example 1.

In the case of the coated greaseproof paper, the release occurred at a cling strength of about 25 gms. The gloss of the laminate was only 1 unit at 60°. This indicates that the copolymer is too soft to be used as the sole release coating per se. It is typical that materials which soften and flow readily under the laminating conditions will produce low gloss surface. A well-known example is polypropylene film.

In the case of the glassine paper and the publication paper, it was found that picking of paper fibers and/or clay coating occurred. Cling strengths were 100–250 gms./5 in. It is apparent that the copolymer is not a substance which when used alone will release from all types of surfaces.

EXAMPLE 18

Example 2 is repeated in every detail except that the alkyl vinyl ether/maleic anhydride copolymer is replaced by an equimolar copolymer of maleic anhydride and octadecene-1, i.e., in Formula I, above, the two R groups form an oxa group and in Formula II, above, $R^2$ is hydrogen, X is $CH_2$ and $R^3$ is a $C_{15}$ alkyl group. The cling strength is 8–16 grams/5 in.

EXAMPLE 19

100 part of the maleic anhydride/alkyl vinyl ether copolymer of Example 2 are refluxed with 50 parts of 1N sulfuric acid at 110° C for 7 hours to hydrolyze the anhydride to the acid, i.e., $R^1$ in Formula I, above, is hydrogen. A white, soft, waxy solid separates from the media, is recovered by decantation, washed in cold water until free of sulfuric acid and dissolved in a 50:50 mixture of isopropanol and toluene to form a solution containing 40% solids. This solution is used in the same manner as the maleic anhydride copolymer of Example 2. The cling strength of the resultant texture release sheet is 57 grams/5 in. A portion of the hydrolyzed copolymer solution is analyzed by infra-red spectroscopy and found to be 90–100% in the form of the acid.

EXAMPLES 20-22

The alkyd resin-maleic anhydride copolymer mixture of Example 2 is applied to a series of different cellulosic sheets at 3.5 lbs./ream add-on as described in said example. The results are set forth in Table I, below. Example 20 employs a sheet of kraft paper, Example 21 a sheet of publication stock, clay coated on one side and Example 22 a sheet of publication stock coated on both sides. Publication stock is a fine paper material usually employed in the printing of fine magazines.

TABLE I

| Example No. | 20 | 21 | 22 |
|---|---|---|---|
| Paper Basis Wt. (lbs./ream) | 40 | 46 | 32 |
| Gurley Densometer (secs.) | 13 | 1860 | 10,200 |
| Apparent Density (gms./cc) | 0.74 | 1.22 | 1.02 |
| Cling Strength (gms./5 in.) | 14 | 21 | 17 |
| Laminate gloss (60°) | 5.0 | 14.0 | 8.0 |
| AA Roughness (microinches) | 100 | 35 | 85 |

EXAMPLES 23-31

The procedure of Example 2 is again followed except that the alkyd resin used is varied as is the copolymer compounded therewith. The copolymer is set forth with reference to Formulae I and II, above. In each instance, results substantially equivalent to those shown in Example 2 are observed. The materials are shown in Table II, below.

TABLE II

| | | | COPOLYMER | | | | |
|---|---|---|---|---|---|---|---|
| EXAMPLE | ALKYD RESIN | | R | $R^1$ | $R^2$ | X | $R^3$ |
| 23 | Soya fatty acids | 40% | | | | | |
| | Benzoic acid | 2% | $OR^1$ | both $C_4$ alkyl | H | O | $C_{10}$ alkyl |
| | Isophthalic acid | 38% | | | | | |

TABLE II-continued

| EXAMPLE | ALKYD RESIN | | COPOLYMER | | | | |
| --- | --- | --- | --- | --- | --- | --- | --- |
| | | | R | R¹ | R² | X | R³ |
| 24* | Glycerol | 20% | | | | | |
| | Coconut oil | 31% | | | | | |
| | Isophthalic acid | 40% | OR¹ | both | H | O | $C_{18}$ alkyl |
| | Trimethylol ethane | 29% | | $C_{18}$ alkyl | | | |
| 25 | Soya fatty acids | 53% | | hydrogen & | | | mixture of |
| | Phthalic anhydride | 27.8% | OR¹ | $C_{12}$ alkyl | H | $CH_2$ | $C_{15}$ alkyl |
| | 98% glycerine | 19.2% | | | | | $C_{19}$ alkyl and |
| | | | | | | | $C_{27}$ alkyl |
| 26 | Soya oil | 45.5% | | hydrogen & | | | |
| | Dehydrogenated | | | $C_{16}$-$C_{16}$ | | | |
| | Castor oil | 15.0% | OR¹ | alkyl mixture | H | O | $C_9$ alkyl |
| | Phthalic anhydride | 23.5% | | | | | |
| | Pentaerythritol | 16.0% | | | | | |
| 27 | Soya oil | 45.1% | | | | | |
| | Isophthalic anhydride | 38.3% | oxa | — | $CH_3$ | O | $C_{12}$ alkyl |
| | Pentaerythritol | 5.6% | | | | | |
| | Ethylene glycol | 11.0% | | | | | |
| 28** | Tall oil fatty acids | 40.4% | | | | | |
| | Adipic acid | 10.5% | oxa | — | H | $CH_2$ | $C_{15}$ alkyl |
| | Trimellitic anhydride | 41.5% | | | | | |
| | Propylene glycol | 38.3% | | | | | |
| 29 | Tall oil fatty acids | 44.7% | | | | | |
| | Phthalic anhydride | 32.6% | oxa | — | H | $CH_2$ | $C_9$ alkyl |
| | Pentaerythritol | 15.9% | | | | | |
| | Ethylene glycol | 6.8% | | | | | |
| 30 | Soya oil | 57.3% | | | | | |
| | Tung oil | 14.2% | oxa | — | H | $CH_2$ | $C_{13}$ alkyl |
| | Phthalic anhydride | 19.5% | | | | | |
| | glycerol | 9.3% | | | | | |
| 31 | Tall oil fatty acids | 27.0% | | | | | |
| | Phthalic anhydride | 38.0% | oxa | — | H | O | $C_{15}$ alkyl |
| | Trimethylol Propane | 35.0% | | | | | |

*mixed melamine - $MF_{5.3}Me_{3.7}$ (average methylolation and methylation) used to cross-link alkyd resin
**hexabutylated hexamethyl melamine used to cross-link alkyd resin

We claim:

1. A self-releasing coating composition comprising an organic solvent solution containing from about 0.5 to about 80.0%, by weight, based on the total weight of the composition, of an organic solvent soluble mixture comprising
   (1) from about 75 to about 99%, by weight, based on the total weight of (1) and (3), of an oil-modified alkyd resin
   (2) from about 30 to about 70%, by weight, based on the total weight of (1), of a polyalkylether of a polymethylol melamine and
   (3) from about 1 to about 25%, by weight, based on the total weight of (1) and (3), of a copolymer containing from about 15 to about 85 mole percent of recurring units having the formula

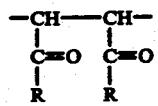

wherein each R is, individually, $OR^1$, $R^1$ being hydrogen or $C_1$-$C_{22}$ alkyl, or the two R groups taken together form an oxa group, and the remaining units are recurring units of the formula

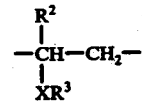

wherein $R^2$ is hydrogen or methyl, $R^3$ is a $C_9$-$C_{30}$ alkyl radical and X is O or $CH_2$.

2. A composition according to claim 1 wherein said recurring units of component (3) are derived from maleic anhydride and a $C_{18}$ alkyl vinyl ether.

3. A composition according to claim 1 wherein the two R groups are taken together and form an oxa group.

4. A composition according to claim 1 wherein both R groups are hydrogen.

5. A composition according to claim 1 wherein $R^2$ is hydrogen, X is $CH_2$ and $R^3$ is a $C_{15}$ alkyl group.

6. A composition according to claim 1 wherein the two R groups are taken together and form an oxa group, $R^2$ is hydrogen, X is $CH_2$ and $R^3$ is a $C_{15}$ alkyl group.

7. A composition according to claim 1 wherein the polyalkylether of a polymethylol melamine is hexakismethoxymethyl melamine.

8. A composition according to claim 1 wherein the alkyd resin is derived from soya oil, isophthalic acid and glycol.

9. A composition according to claim 1 wherein the alkyd resin is derived from soya oil, isophthalic acid and glycerol and the copolymer is derived from maleic anhydride and a $C_{18}$ alkyd vinyl ether.

10. A composition according to claim 1 wherein the alkyd resin is derived from soya oil, isophthalic acid and glycerol and the copolymer is derived from maleic anhydride and octadecene-1.